United States Patent
Wang et al.

(10) Patent No.: US 7,718,285 B2
(45) Date of Patent: May 18, 2010

(54) TYPE OF FUEL CELL BATTERY

(75) Inventors: Chuanfu Wang, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 906 days.

(21) Appl. No.: 11/323,966

(22) Filed: Dec. 29, 2005

(65) Prior Publication Data

US 2006/0147766 A1 Jul. 6, 2006

(30) Foreign Application Priority Data

Dec. 30, 2004 (CN) .................... 2004 1 01040074

(51) Int. Cl.
H01M 8/06 (2006.01)
(52) U.S. Cl. .............. 429/19; 429/30; 429/32; 429/34
(58) Field of Classification Search .............. 429/34, 429/32, 30, 19
See application file for complete search history.

(56) References Cited

U.S. PATENT DOCUMENTS

| 5,795,496 | A | 8/1998 | Yen et al. |
|---|---|---|---|
| 5,948,558 | A | 9/1999 | Amendola |
| 6,468,694 | B1 | 10/2002 | Amenola |
| 2002/0015869 | A1* | 2/2002 | Suda ............................ 429/19 |
| 2003/0129467 | A1 | 7/2003 | Morishima et al. |
| 2004/0013928 | A1* | 1/2004 | Yamauchi et al. ............. 429/34 |
| 2004/0096721 | A1* | 5/2004 | Ohlsen et al. ................. 429/34 |

FOREIGN PATENT DOCUMENTS

CN 1159793 C 7/2004

* cited by examiner

*Primary Examiner*—Jane Rhee
(74) *Attorney, Agent, or Firm*—Venture Pacific Law, PC (57) ABSTRACT

A fuel cell battery, comprising a chamber unit (1), an anode entrance (2) connected to the chamber unit (1), an anode exit (3), a cathode entrance (4) and a cathode exit (5). The anode entrance (2) is connected to a hydrogen source (11) and an organic fuel source (12) respectively through a hydrogen duct (9) and an organic fuel duct (10). Duct (9) and duct (10) are respectively installed with a hydrogen valve (13) and an organic fuel valve (14). An exit valve (20) is installed at the anode exit. This fuel cell battery combines the advantages provided by hydrogen fuel and organic fuel. The fuel cell battery can meet the dual requirements of operating on both high and low power. The fuel cell battery's design leads to low manufacturing costs, a simple structure, and easy implementation.

20 Claims, 5 Drawing Sheets

TYPE OF FUEL CELL BATTERY

CROSS REFERENCE

This application claims priority from a Chinese patent application entitled "A Type of Fuel Cell Battery" filed on Dec. 30, 2004 and having a Chinese Application No. 200410104007.4. Said application is incorporated herein by reference.

FIELD OF INVENTION

This invention relates to a type of battery, specifically, a type of fuel cell battery.

BACKGROUND

Figure 1:
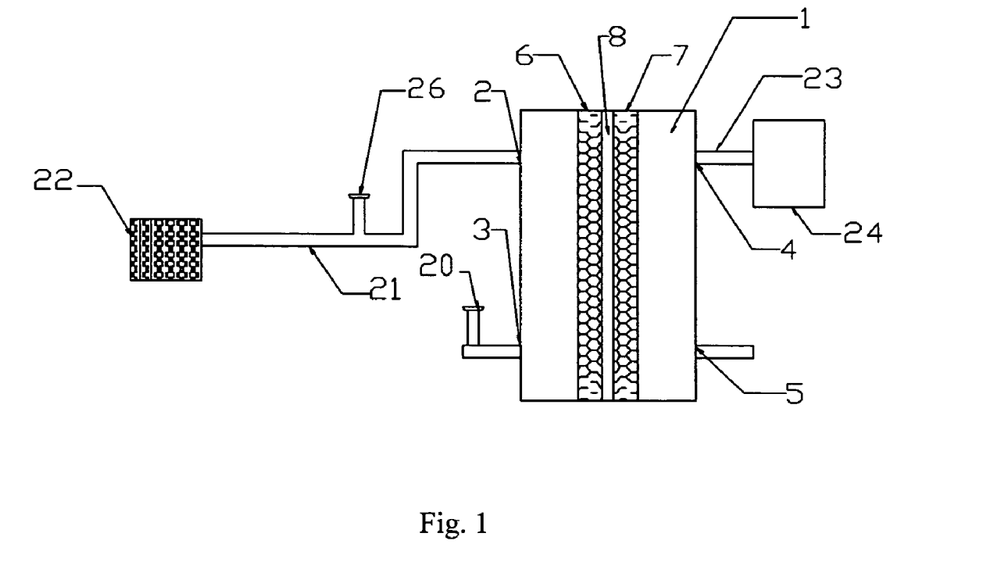
FIG. 1 is an illustration of the structure of a currently available cell.

Fuel cell batteries are a type of device which converts chemical energy into electric energy. As shown in FIG. 1, a currently available fuel cell battery generally comprises a chamber unit (1), an anode entrance (2) connected to chamber unit (1), an anode exit (3), a cathode entrance (4) and a cathode exit (5). Anode entrance (2) is connected to a fuel source (22) through a duct (21). A valve (26) is installed in duct (21). A valve (20) is installed at anode exit (3). Cathode entrance (4) is connected to an oxidant source (24) through a duct (23). Chamber unit (1) contains an anode (6), a cathode (7), and a proton-exchange membrane (8) located between anode (6) and cathode (7).

Anode (6) is a type of gaseous diffusion electrode, with its supporting material generally made of electric conductive carbon fiber or carbon fabric. A catalyst is located between anode (6) and proton-exchange membrane (8) to catalyze the anode chemical reaction. Such anode catalyst is generally platinum powder, alloy powder containing platinum, platinum loaded on a carrier, or alloy powder containing platinum loaded on a carrier. Said alloy containing platinum also has one or more of the following including ruthenium, stannum, indium, osmium, and rhenium. Said carrier, such as active carbon, is electrically conductive and has relatively high surface area. On the external side of the anode is the current collector which can be made of graphite material or metal material.

Cathode (7) is also a type of gaseous diffusion electrode, with an identical structure as in the anode. The difference is that the catalyst between cathode (7) and proton-exchange membrane (8) catalyzes the cathode chemical reaction. Such cathode catalyst is generally platinum powder, or platinum powder loaded on a carrier. On the external side of the cathode is a current collector, which can be made of graphite material or metal material.

The proton-exchange membrane (8) is a type of semi-permeable membrane that is air-water-tight but not water-air-tight. The membrane conducts protons, and it can also prevent mixing the catalyst and the fuel which can cause an explosion.

In the following examples, the fuel is methanol and hydrogen, and the oxidant is air or oxygen. The fuel enters the anode side of chamber unit (1) through anode entrance (2), passing through anode (6) and leading to a chemical reaction.

When the fuel is methanol, the chemical reaction of anode (6) is:

$$CH_3OH+H_2O \rightarrow CO_2+6H^++6e \qquad (1)$$

When the fuel is hydrogen gas, the chemical reaction of anode (6) is:

$$3H_2 \rightarrow 6H^++6e \qquad (2)$$

The generated carbon dioxide and the unreacted fuel are discharged through anode exit (3).

Meanwhile, the following chemical reactions happen at cathode (7):

$$\tfrac{3}{2}O_2+6H^++6e \rightarrow 3H_2O, \qquad (3)$$

The chemical reactions (1) and (3), and the reactions (2) and (3) of the individual electrodes respectively lead to the following general reactions:

$$CH_3OH+\tfrac{3}{2}O_2 \rightarrow CO_2+2H_2O \qquad (4)$$

$$3H_2+\tfrac{3}{2}O_2 \rightarrow 3H_2O \qquad (5)$$

The above reactions at anode (6) and cathode (7) create a voltage difference between the two electrodes. The electrons generated by anode (6) are captured by the cathode after moving through the current collector and the external conductor located on the external side of the anode. The protons generated by anode (6) will be directly passed on to cathode (7) through the proton membrane, creating an electric current.

Not only can the fuel of said fuel cell be methanol and hydrogen gas, but it can also be other organic fuel. For example, said organic fuel can be selected from one or more of the following including alcoholic fluid, aqueous ether, and organic acid fluid. Alternatively, the organic fuel can be selected from one or more of the following including alcoholic fluid solution and acid fluid solution. The preferred selection has one or more of the following including methanol, ethanol, formic acid (or methanoic acid), and ethylether. Alternatively, the selection can have one or more of the following including methanol solution, ethanol solution, and formic acid (or methanoic acid) solution.

Said fuel cell using organic fuel has the advantages such as minimized pollution, a low noise level, a simple structure, being easy to carry, and a wide variety of fuel sources which are easy to obtain. Also, because the organic fuel is liquid, it has a high energy ratio. In terms of storage, there is no need to use, for example, a pressurized container, making it easy to carry. Meanwhile, compared to the inflammable hydrogen gas which is prone to explosion, organic fuel is reliably safe.

Although fuel cells using organic fuel have the above mentioned advantages, there are also certain disadvantages. A major one is that the platinum catalyst is not effective with organic fuel. In the process of catalyzing the oxidization of the organic fuel, carbon monoxide is generated as a byproduct. The carbon monoxide byproduct mixes with the platinum in the catalyst and forms a stable coordination compound, poisoning the catalyst. Therefore, compared to a cell using hydrogen fuel, the above mentioned cell using organic fuel has a very low density of electrode power output in a unit area. Taking said cell using methanol as an example, based on reported data, the density of power output in a unit area of a cell using hydrogen is more than ten (10) times that of said cell using methanol. To achieve the same power output, a cell using organic fuel must have an active area several times that of a cell using hydrogen gas. Consequently, the use of costly metal in the catalyst, such as platinum, also has to be several times more. Therefore, when organic fuel is used in the cell, the manufacturing cost of the fuel cell increases significantly.

Typical electronic product have similar power requirement from batteries, and the batteries generally operates in cyclic pulses. Taking the cell phone as an example, during the long periods in the standby mode, the cell phone operates on low power and its requirement for the cell's power output remains low. However, during the short period of telephone communication, the cell phone operates on high power and the requirement for the battery's power output will be high.

Between those two operating conditions, there is a difference of roughly ten (10) times in power output requirement.

Using hydrogen gas as fuel, a fuel cell can have a very high density of power output in a unit area. The reason is that the catalyst containing platinum is highly effective in hydrogen gas. Therefore, theoretically a cell using hydrogen gas can meet the dual requirements of both a long standby and a high power output during the short period of telephone communication. However, the disadvantage of using hydrogen gas as fuel lies in the highly inflammable nature of hydrogen gas which is prone to explosion. So far, there is no ideal way of storing hydrogen gas. To achieve a long standby period on a cell phone, large amount of hydrogen needs to be carried, creating potential safety hazards and limiting the transportation options of the battery user.

If organic fuel is used, a fuel cell must have a much larger size and a much larger cell area to meet the requirement of high power output during a short time. That will increase the manufacturing cost of the fuel cell and its bulkiness.

SUMMARY OF THE INVENTION

An object of this invention is to provide a type of fuel cell battery which is easy to carry, inexpensive, and meets low and high power output operating requirements.

A presently preferred embodiment of the present invention is a fuel cell battery comprising a chamber unit (1), an anode entrance (2) connected to chamber unit (1), an anode exit (3), a cathode entrance (4) and a cathode exit (5). Chamber unit (1) comprises an anode (6), a cathode (7), and a proton-exchange membrane (8) located between anode (6) and cathode (7). Cathode entrance (4) is connected to an oxidant source (24) through a duct (23). Anode entrance (2) is connected to a hydrogen source (11) and an organic fuel source (12) respectively through a hydrogen duct (9) and a organic fuel duct (10). Duct (9) and duct (10) are respectively installed with a hydrogen valve (13) and an organic fuel valve (14). An exit valve (20) is installed at the anode exit.

The presently preferred embodiment of the fuel cell battery of this invention combines the advantages of batteries using hydrogen fuel and those using organic fuel. When the fuel cell battery needs to operate on low power output for a long period of time, organic fuel is used to supply the fuel cell battery. When a short period of high power output is required, the battery turns off the organic fuel supply and switches to hydrogen fuel. When the temporary high power output is completed, the battery switches back to organic fuel supply. This technique effectively solves the problems including a low power density ratio of organic fuel cells and their catalyst's tendency of easily being poisoned. It avoids the disadvantages of low density efficiency, catalyst poisoning, and having to manufacture an organic fuel cell battery of a larger size and cell area. And it also avoids the disadvantages of a hydrogen fuel cell battery including having to carry a large amount of hydrogen, the fire and explosion hazards, and the transportation inconvenience. With a smaller size and cell area, and without carrying a large amount of hydrogen, the battery provided in this invention can meet the dual requirements of operating on high and low power output. Since the battery merely has an additional fuel source compared to currently available batteries, its manufacturing cost is low. In addition, it has a simple structure and is easy to implement.

DETAILED DESCRIPTION OF THE PREFERRED EMBODIMENTS

Figure 2:
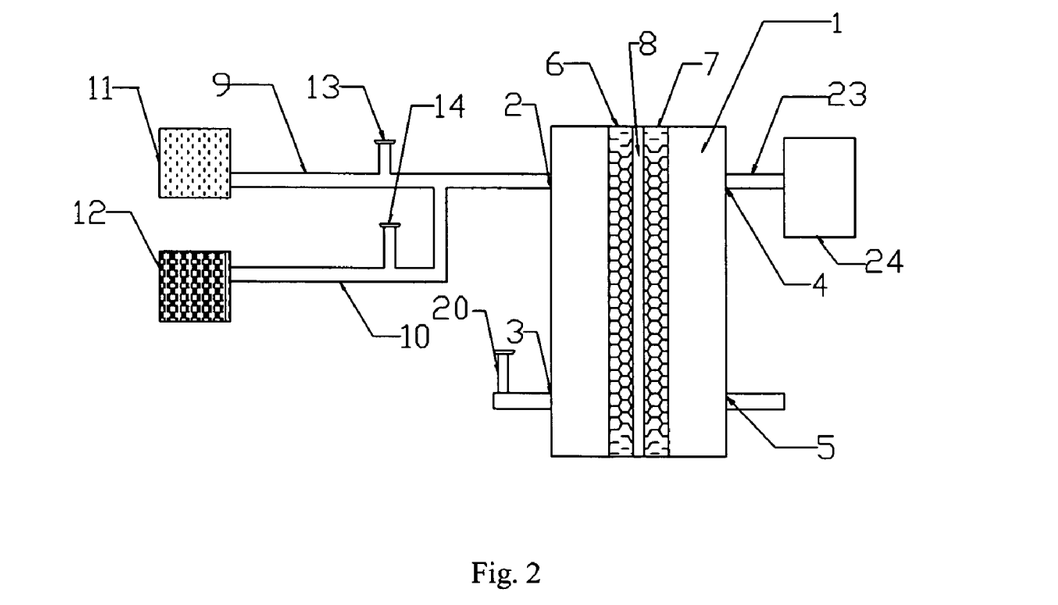
FIGS. 2-5 are illustrations of the fuel cell structures of this invention.

As shown in FIG. 2 of this application, a presently preferred embodiment of the present invention provides a battery comprising a chamber unit (1), an anode entrance (2) connected to chamber unit (1), an anode exit (3), a cathode entrance (4) and a cathode exit (5). Chamber unit (1) comprises an anode (6), a cathode (7) and a proton-exchange membrane (8) located between anode (6) and cathode (7). Cathode entrance (4) is connected to an oxidant source (24) through a duct (23). Said anode entrance (2) is connected to a hydrogen source (11) and an organic fuel source (12) respectively through a hydrogen duct (9) and an organic fuel duct (10). Duct (9) and duct (10) are respectively installed with a hydrogen valve (13) and an organic fuel valve (14). An exit valve (20) is installed at the anode exit.

Said hydrogen source (11) can be any device which supplies hydrogen gas, such as a hydrogen gas storage device or a device containing matters which generate hydrogen gas. Such device can be selected from the currently available sources such as a fuel tank which stores compressed hydrogen gas or matters which generate hydrogen gas. The hydrogen gas generating matters include hydrogen-depository alloy which stores hydrogen gas, hydrogen-depository compound, and solution containing hydrogen-depository compound.

The types of said hydrogen-depository alloy are generally known to a person of ordinary skill in the art. The hydrogen-depository alloy, for example, can be selected from any kind of hydrogen-depository alloy which can absorb hydrogen gas and reverse the process by desorbing the stored hydrogen gas. As an example, CN1159793C describes one or more types of hydrogen-depository alloy being used at the cathode in a secondary battery, specifically one or more of the following including TiFe alloy, $LaNi_5$ alloy, and $Mg_2Ni$ alloy.

The types of said hydrogen-depository compounds are generally known to a person of ordinary skill in the art, for example, $NaBH_4$ and/or $KBH_4$. U.S. Pat. No. 5,948,558 and U.S. Pat. No. 6,468,694 have described the hydrogen-depository compounds in detail.

Based on a preferred embodiment of this invention, said hydrogen source (11) is a fuel tank which stores compressed hydrogen gas. Alternatively, the preferred fuel tank contains one or more of the following types of hydrogen-absorbing compounds including TiFe alloy, $LaNi_5$ alloy, $Mg_2Ni$ alloy, water-based $NaBH_4$ solution, and water-based $NaKH_4$ solution. When valve (13) is opened, one or more of the above mentioned compounds including TiFe alloy, $LaNi_5$ alloy, $Mg_2Ni$ alloy, water-based $NaBH_4$ solution, and water-based $NaKH_4$ solution which absorbed hydrogen gas can desorb the hydrogen gas and release the hydrogen. The material for the fuel tank containing hydrogen gas or said hydrogen-depository compounds including TiFe alloy, LaNi$_5$ alloy, Mg$_2$Ni alloy, water-based NaBH$_4$ solution, and water-based NaKH$_4$ solution is generally known to a person of ordinary skill in the art. Such material can be, for example, stainless steel, polytetrafluoroethylene, or porcelain.

Organic fuel source (12) can be any device supplying organic fuel, for example, a fuel tank storing organic fuel. The material for the fuel tank storing the organic fuel is generally known to a person of ordinary skill in the art. Such material can be, for example, stainless steel, polytetrafluoroethylene, or porcelain.

The organic fuel is selected from one or more of the different types of organic fuel or organic fuel solution. The organic fuel can be selected from, for example, one or more of the following including alcoholic fluid, aqueous ether, and organic acid fluid. Alternatively, the fuel can be selected from one or more of the following including alcoholic fluid solution and acid fluid solution. The preferred selection is one or more of the following including methanol, ethanol, formic acid (or methanoic acid), and ethylether. Alternatively, the preferred selection can be one or more of the following including methanol solution, ethanol solution, and formic acid (or methanoic acid) solution.

Figure 3:
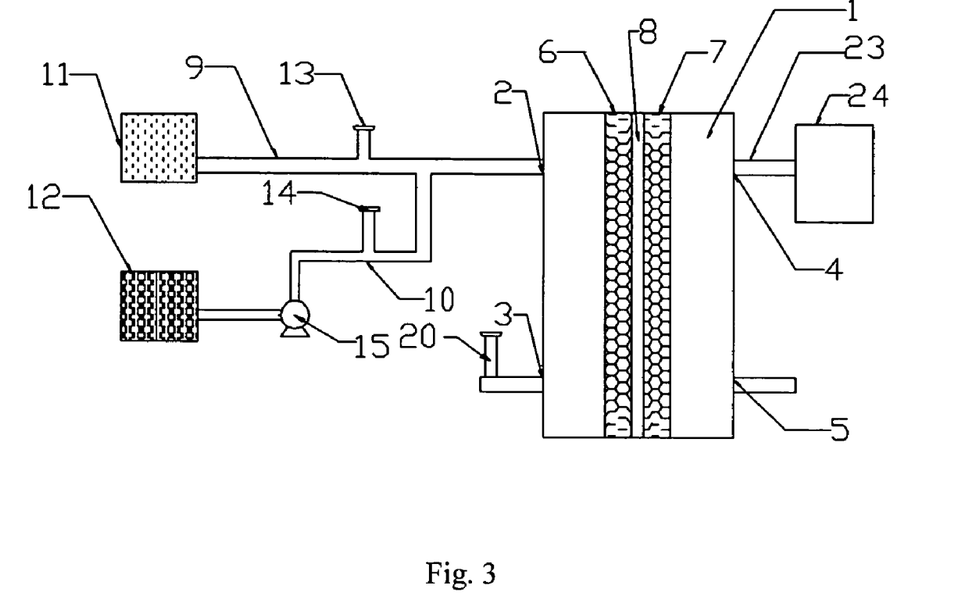

The driving force for supplying said organic fuel can be employed by the way of pressure difference, or by pumping. As shown in FIG. 3, based on a preferred embodiment of this invention, a pump (15) is installed in before or after the organic fuel valve (14). Pump (15) provides pressure for the fuel to enter the cell. The pump can be operated manually, or controlled by a currently available automatic device.

Valve (13) can be any valve which controls hydrogen gas flow. The types of such valves are generally known to a person of ordinary skill in the art. For example, the valve can be of the needle type or the ball type. Valve (14) can be any valve which controls the flow of the liquid organic fuel. The types of such valves are generally known to a person of ordinary skill in the art, such as valves of the needle type or the ball type. Valve (20) can be any valve which controls the flow of liquid or air. The types of such valves are generally known to a person of ordinary skill in the art, such as valves of the needle type or the ball type. Valves (13), (14) and (20) can be controlled manually, or controlled by a currently available automatic device. For example, any of valves (13), (14) and (20) can be an electromagnetic valve. The electromagnetic valve opens and closes based on the directions of the device controlling the operation of the fuel cell. When the cell needs to operate on high power output, a switch in the electronic device is turned to "on," and valve (13) automatically opens, while valves (14) and (20) automatically close. In contrast, when the cell needs to operate on low power, a switch in the electronic device is turned to "off," and valves (14) and (20) automatically open, while valve (13) automatically closes.

For a battery based on this invention, chamber unit (1) can be any currently available chamber unit (or called electricity generating unit). Such chamber unit contains an anode (6), a cathode (7) and a proton-exchange membrane (8) located between anode (6) and cathode (7).

Anode (6) is a type of gaseous diffusion electrode, with its supporting material being electric conductive carbon fiber or carbon fabric. A catalyst is located between anode (6) and proton-exchange membrane (8) to catalyze the reaction at the anode. Such anode catalyst generally is platinum powder, alloy powder containing platinum, platinum loaded on a carrier, or alloy powder containing platinum loaded on a carrier. Said alloy contains platinum and one or more of the following including ruthenium, stannum, indium, osmium, and rhenium. Said carrier, such as active carbon, is electric conductive and has relatively high specific surface. Located on the external side of the anode is a current collector which can be made of graphite material or metal material. The metal material can be selected from one or more of the following or their alloy, including steel, copper, titanium, and silver.

Cathode (7) is also a type of gaseous diffusion electrode, with a structure similar to that of the anode. The difference is that the catalyst between cathode (7) and proton-exchange membrane (8) catalyzes the chemical reaction at the cathode. Such catalyst generally is platinum powder, or platinum loaded on a carrier. Located on the external side of the cathode is also a current collector which can be made of graphite material or metal material. The metal material can be selected from one or more of the following or their alloy, including steel, copper, titanium, and silver.

Proton-exchange membrane (8) can be any semi-permeable membrane which is air-tight but not water-tight and which conducts protons. Such membrane can be the generally known Nafion membrane, or the proton-exchange membranes disclosed in U.S. Pat. No. 5,795,496, and in US20030129467.

For a battery based on this invention, when the fuel cell battery needs to operate on low power over a long period of time, valve (14) and valve (20) are opened (when a pump (15) is included, pump (15) is turned on at the same time). Valve (13) is closed, and the fuel cell is supplied with alcoholic fuel. When the fuel cell needs to operate on high power for a short period of time, valve (14) and valve (20) are closed (when a pump (15) is included, pump (15) is turned off at the same time). Valve (13) is opened, and the fuel cell is supplied with hydrogen fuel. When the temporary high power output is over, valve (14) and valve (20) are open (when a pump (15) is included, pump (15) is turned on at the same time). Valve (13) is closed, and the fuel cell is supplied with organic fuel.

For a battery based on this invention, the oxidant entering the cathode entrance can be oxygen or air. Considering the cost, air is preferred. The driving force for supplying the cell with air can be employed by the way of air pressure difference using, for example, an air compressor.

Figure 4:
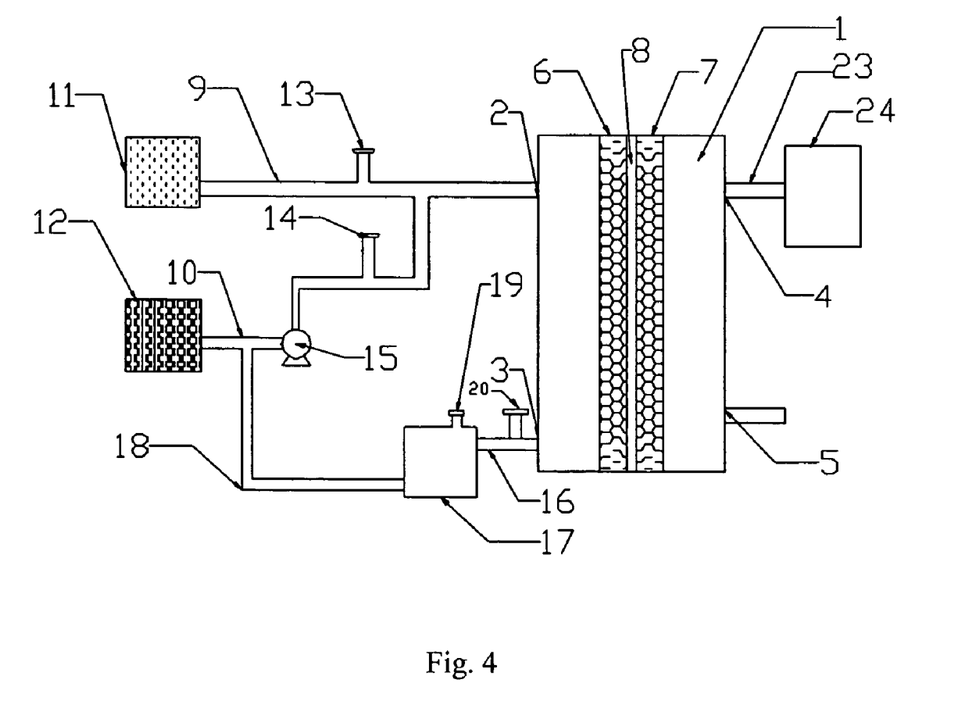

As shown in FIG. 4, to further make use of the water resource and any unreacted fuel, a preferred embodiment of this invention includes a recycler (17) connected to an anode exit (3) through an exit duct (16). The recycler (17) also connects to the organic fuel duct (10) through a return duct (18). A recycler exit (19) is located on the recycler (17). Thus, the product of the anode reaction enters recycler (17) through the exit duct (16), and the carbon dioxide is discharged through the recycler exit (19). Water and any unreacted organic fuel circulate to duct (10) through duct (18), mixing with the organic fuel from the organic fuel source (12) and become used again in another cycle of reaction.

Figure 5:
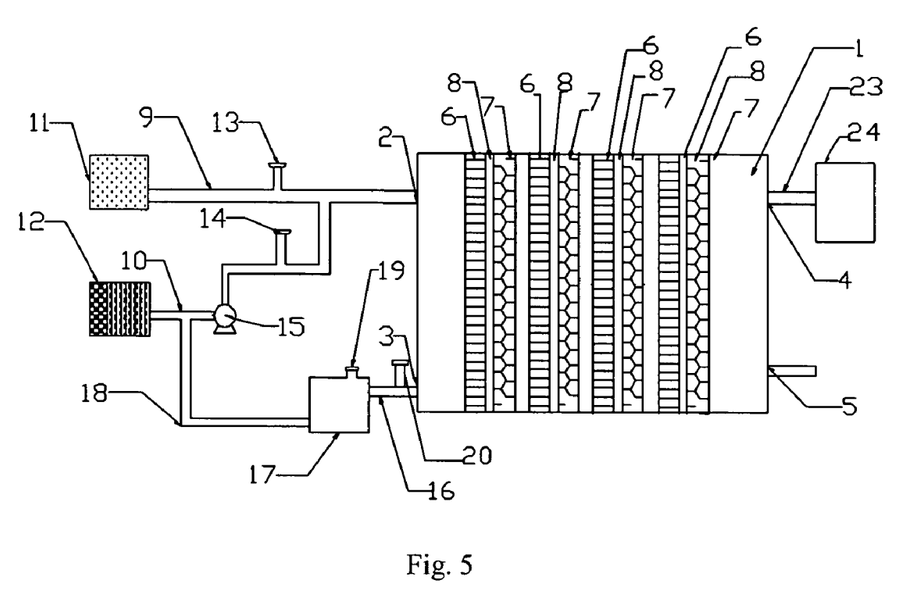

Chamber unit (1) may comprise a group of electrodes each including an anode (6), a cathode (7), and a proton-exchange membrane (8) located between anode (6) and cathode (7). Then, such a cell is called a singular electrode cell. The singular electrode of the chamber unit can be replaced with a series circuit of combined identical singular electrode (or cell group). The number of said singular electrode groups can be determined according to the amount of the cell power output. The number of the singular electrode groups can be between 2 to 500, preferably 2 to 100. FIG. 5 provides the illustration of a cell with four groups of singular electrodes. The technology for grouping and connecting the cell group is generally known to a person of ordinary skill in the art.

A battery of this invention can be the power source for various types of electronic products which require low power output for a long period of time and high power output for a short period of time, such as cell phones, PDAs, and laptop computers.

The following exemplary embodiments further illustrate this invention.

Embodiment 1

The following embodiment illustrates a battery of this invention.

The battery is shown in FIG. 2.

In FIG. 2, oxidant (24) is an air compressor, and duct (23) is a silicone duct with a diameter of 3 mm.

The active area of the cell is 6 cm$^2$. The supporting material of anode (6) is carbon fiber. The catalyst of anode (6) is the platinum-and-ruthenium-over-carbon catalyst product of the J-M Company. In the catalyst, platinum constitutes 20% of the weight percentage, and ruthenium 10% of the weight percentage. The density of platinum and ruthenium is 4 mg/cm$^2$. The current collector on the external side of anode (6) is made of graphite material.

The current collector on the external side of cathode (7) is made of graphite material and the supporting material is carbon fiber. The catalyst of cathode (7) is the platinum-over-carbon catalyst product of the J-M Company. In the catalyst, platinum constitutes 40% of the weight percentage. The density of platinum is 1 mg/cm$^2$ (the active area will be the same in the following). Proton-exchange membrane (8) is the Nafion115 membrane of the DuPont Company.

Duct (9) and duct (10) are silicone ducts, with a diameter of 3 mm. Hydrogen source (11) is a fuel tank containing water-based NaBH$_4$ solution. The hydrogen fuel tank is a rectangular solid made of stainless steel with the dimensions of 15 mm×15 mm×20 mm. Organic fuel tank (12) contains water-based methanol solution of 2 mol/L. The organic fuel tank has the shape of a cylinder, with an inner diameter of 15 mm and a length of 20 mm, and is made of silicone plastic. Valves (13), (14) and (20) are of the needle type. When hydrogen is used as fuel, valve (13) is opened and valves (14) and (20) are closed. When the fuel source is switched to organic fuel, valve (13) is closed and valves (14) and (20) are opened.

Embodiment 2

The following embodiment illustrates a battery of this invention.

The battery is equipped as shown in FIG. 3.

In FIG. 3, oxidant (24) is an air compressor, and duct (23) is a silicone duct with a diameter of 3 mm.

In FIG. 3, the active area of the cell is 20 cm$^2$. The current collector on the external side of anode (6) is made of stainless steel. The supporting material of the anode is carbon fabric. The catalyst of the anode is the platinum-and-ruthenium-over-carbon catalyst product of the J-M Company. In the catalyst, platinum constitutes 30% of the weight percentage, and ruthenium 15% of the weight percentage. The platinum and ruthenium density is 3 mg/cm$^2$. Proton-exchange membrane (8) is the Nafion117 membrane of the DuPont Company.

The supporting material of cathode (7) is carbon fabric. The catalyst of cathode (7) is the platinum-over-carbon catalyst product of the J-M Company. In the catalyst, platinum constitutes 20% of the weight percentage. The density of platinum is 1 mg/cm$^2$. The current collector on the external side of the cathode is made of stainless steel.

Duct (9) and duct (10) are silicone ducts, with a diameter of 4 mm. Hydrogen source (11) is a fuel tank containing compressed hydrogen gas. The hydrogen fuel tank is made of stainless steel and has the shape of a cylinder with an inner diameter of 20 mm and a length of 20 mm. Organic fuel tank (12) contains water-based ethanol solution of 3 mol/L. The organic fuel tank has the shape of a cylinder with an inner diameter of 15 mm and a length of 20 mm. The organic fuel tank is made of silicone plastic. Valves (13), (14) and (20) are of the ball type. Pump (15) is a miniature vermiculation pump available on the market. The pump has a maximum flow rate of 100 mL/min.

When the hydrogen source is used for the fuel, valve (13) is opened, and valves (14) and (20) are closed, and pump (20) is turned off. When the cell switches to the organic fuel, valve (13) is closed, and valves (14) and (20) are opened, and pump (15) is turned on.

Embodiment 3

The following embodiment illustrates a battery of this invention.

The battery is equipped as shown in FIG. 4.

In FIG. 4, oxidant source (24) is an air compressor, and duct (23) is a silicone duct with a diameter of 3 mm.

In FIG. 4, the active area of the cell is 50 cm$^2$. The current collector on the external side of anode (6) is made of titanium. The supporting material of the anode is carbon fabric. The catalyst of the anode is the platinum-and-ruthenium-over-carbon catalyst product of the J-M Company. In the catalyst, platinum constitutes 30% of the weight percentage, and ruthenium 30% of the weight percentage. The density of platinum and ruthenium is 4 mg/cm$^2$. Proton-exchange membrane (8) is the Nafion117 membrane of the DuPont Company.

The supporting material of cathode (7) is carbon-fiber paper. The catalyst of cathode (7) is the platinum-over-carbon catalyst product of the J-M Company. In the catalyst, platinum constitutes 40% of the weight percentage. The platinum density is 1 mg/cm$^2$. The current collector on the external side of the cathode is made of titanium.

Duct (9) and duct (10) are silicone ducts, with a diameter of 4 mm. Hydrogen source (11) is a fuel tank containing hydrogen-absorbed TiFe alloy. The hydrogen fuel tank is made of stainless steel and has the shape of a cylinder with an inner diameter of 20 mm and a length of 20 mm. Organic fuel tank (12) contains water-based methanoic acid solution of 3 mol/L. The organic fuel tank has the shape of a cylinder with an inner diameter of 15 mm and a length of 20 mm. The organic fuel tank is made of silicone plastic. Valves (13), (14) and (20) are of the electromagnetic type, controlled by the strength of the electric current. Pump (15) is a miniature vermiculation pump available on the market. The pump has a maximum flow rate of 100 mL/min. The pump is switched on and off by the strength of the electric current. Recycler (17) is a rectangular solid made of polytetrafluoroethylene. Ducts (16) and (18) are silicone ducts of a diameter of 3 mm.

When the hydrogen source is used as fuel, valve (13) is opened, and valves (14) and (20) are closed, and pump (15) is turned off. When the cell switches to the organic fuel, valve (13) is automatically closed, and valves (14) and (20) are opened, and pump (15) is turned on.

Embodiment 4

The following embodiment illustrates a battery of this invention.

The battery is equipped as shown in FIG. 5.

In FIG. 5, oxidant source (24) is an air compressor, and duct (23) is a silicone duct with a diameter of 5 mm.

Chamber unit (1) contains a series circuit of four groups of combined singular electrodes, with each singular electrode comprising an anode (6), a cathode (7), and a proton-exchange membrane (8) located between anode (6) and cathode (7). The anode, cathode and the proton-exchange membrane are identical to those in Embodiment 1, Duct (9) and duct (10) are silicone ducts, with a diameter of 5 mm. Hydrogen source (11) is a fuel tank containing compressed hydrogen. The hydrogen fuel tank is made of stainless steel and has the shape of a cylinder with an inner diameter of 25 mm and a length of 40 mm. Organic fuel tank (12) contains water-based methanol solution of 2 mol/L. The organic fuel tank has the shape of a cylinder with an inner diameter of 20 mm and a length of 20 mm. The organic fuel tank is made of silicone plastic. Valves (13), (14) and (20) are of the electromagnetic type, controlled by the strength of the electric current. Pump (15) is a miniature vermiculation pump available on the market. The pump is switched on and off by the strength of the electric current. The pump has a maximum flow rate of 100 mL/min. Recycler (17) is a rectangular solid made of polytetrafluoroethylene with dimensions of 10 mm×10 mm×25 mm. Ducts (16) and (18) are silicone ducts of a diameter of 5 mm.

When the hydrogen source is used as fuel, valve (13) is opened, and valves (14) and (20) are closed, and pump (15) is turned off. When the cell switches to the organic fuel, valve (13) is closed, and valves (14) and (20) are opened, and pump (15) is turned on.

Exemplary Embodiment 5

This embodiment illustrates the performance of a battery of this invention.

A cell made in accordance to Embodiment 1 can operate as follows: open valve (13) (while valves (14) and (20) remain closed), and the cell uses the hydrogen fuel source. Meanwhile, using the oxidant source (24) (the air compressor), air is guided to the cathode of the cell. The maximum air flow rate of the air compressor is 10 L/min, and the relative pressure at the exit is $2\times10^4$ Pa. The stoichiometry of the air during the chemical reaction is 2.5. Apply electric loading to discharge the electricity of the fuel cell. The power output of the fuel cell is set as constant current output, and the electric current output (of the low and high power output) are respectively set at 30 mA/cm$^2$ and 150 mA/cm$^2$. When the electric current is at 30 mA/cm$^2$, the cell uses organic fuel source (12). When the electric current is at 150 mA/cm$^2$, the cell uses hydrogen fuel source (11).

Figure 6:
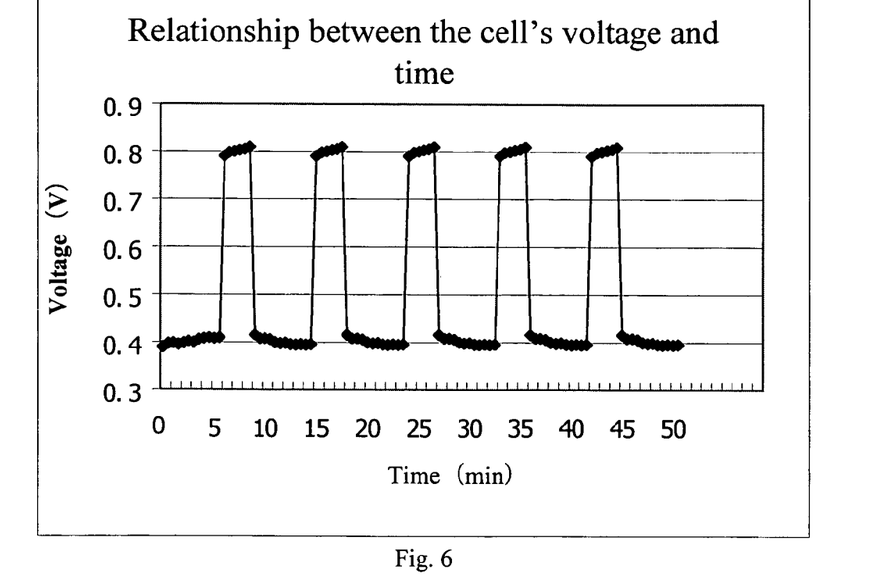
FIG. 6 is a graph showing the relationship between the cell's voltage and time based on an exemplary embodiment of the present invention.
Figure 7:
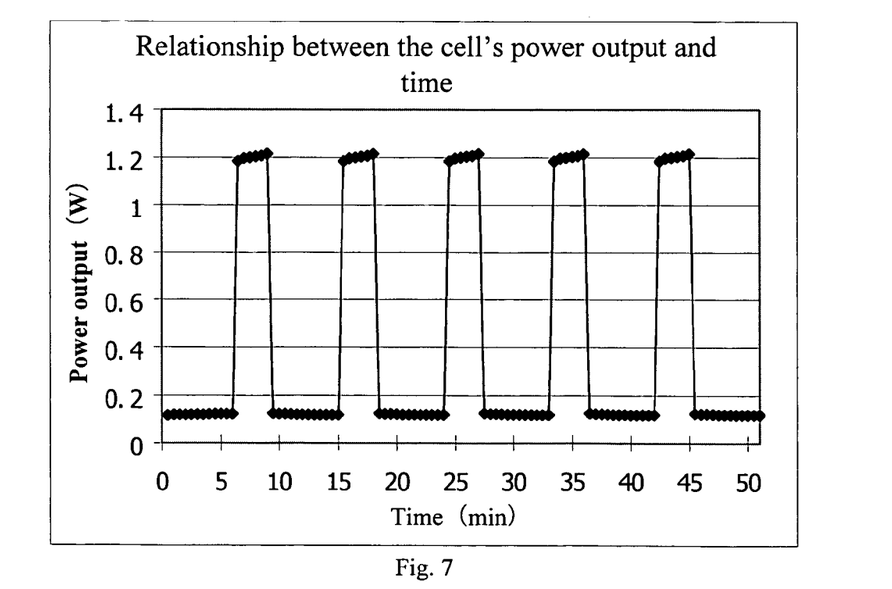
FIG. 7 is a graph showing the relationship between the cell's power output and time based on an exemplary embodiment of the present invention.

Meanwhile, to mimic the working condition of the actual electronic products, i.e. standby on low power for a long period of time and requiring high power for a short period of time in each cycle, the discharging periods for 30 mA/cm$^2$ and 150 mA/cm$^2$ are respectively set at 6 minutes and 3 minutes. At the end of each cycle, a new cycle starts again. The opening and closing of valves (13), (14) and (20) are synchronized with the cycles. When the electric current output is at 30 mA/cm$^2$, valve (13) is closed, and valves (14) and (20) are opened. When the electric current output is switched to 150 mA/cm$^2$, valve (13) is opened, and valves (14) and (20) are closed. At the end of each cycle, a new cycle starts again. During the fuel cell's operation, the data of the electric current and the voltage are recorded every 30 seconds. The data obtained are shown in FIG. 6 and FIG. 7.

Exemplary Embodiment 6

This embodiment illustrates the performance of a battery of this invention.

A cell made in accordance to Exemplary Embodiment 4 can operate as follows: using oxidant source (24) (the air compressor), air is guided to the cathode of the cell. The maximum air flow rate of the air compressor is 20 L/min, and the relative pressure at the exit is $2\times10^4$ Pa. The stoichiometry of the air during the chemical reaction is 2.5. Apply electrical loading to discharge the electricity of the fuel cell. The power output of the fuel cell is set as constant current output, the electric current output (of the low and high power output) are respectively set at 2.4 W and 24 W. When the electric current is at 2.4 W, the cell uses organic fuel. When the electric current is at 24 W, the cell uses hydrogen fuel.

Figure 8:
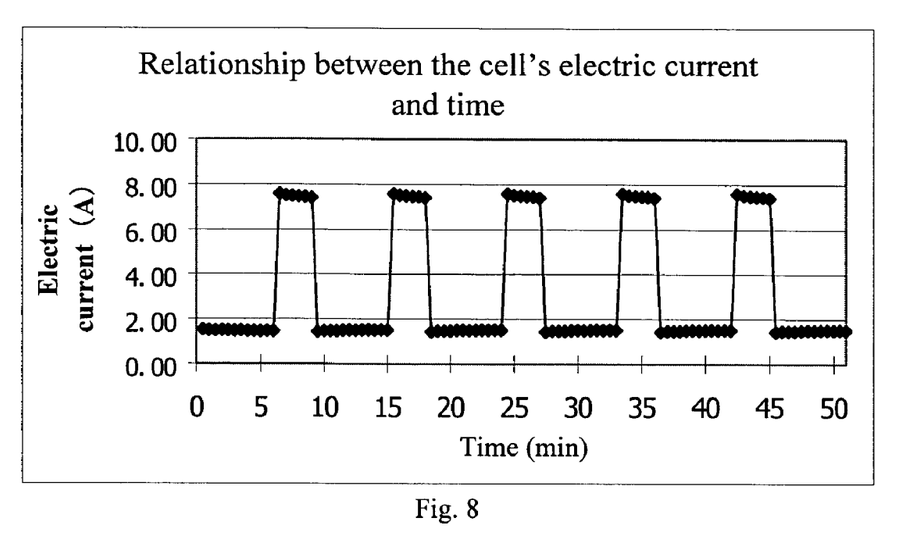
FIG. 8 is a graph showing the relationship between the cell's electric current and time based on an exemplary embodiment of the present invention.
Figure 9:
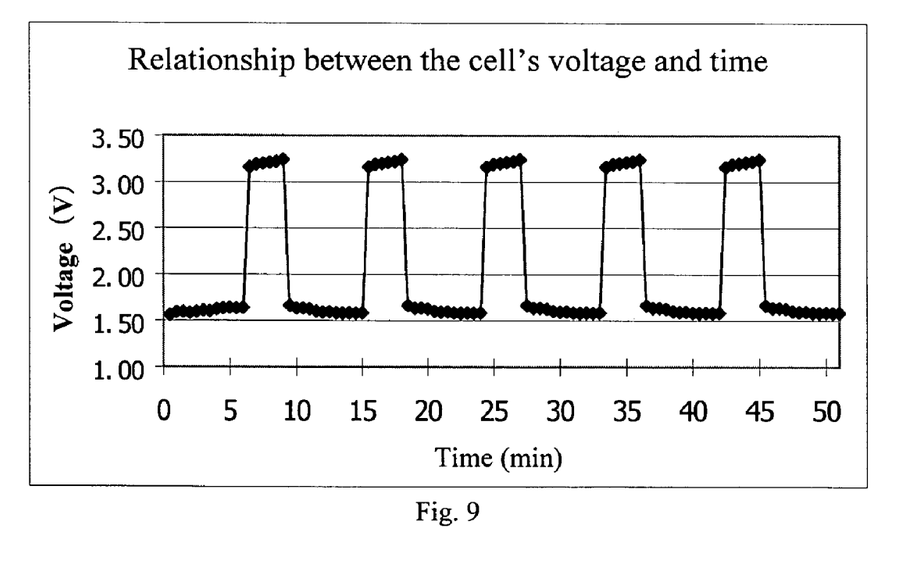
FIG. 9 is a graph showing the relationship between the cell's voltage and time based on an exemplary embodiment of the present invention.

Meanwhile, to mimic the working condition of the actual electronic products, i.e. standby on low power for a long period of time and requiring high power for a short period of time in each cycle, the discharging periods of 2.4 W and 24 W are respectively set at 6 minutes and 3 minutes. At the end of each cycle, a new cycle starts again. The opening and closing of valves (13), (14) and (20) and the turning on and off of pump (15) are synchronized with the cycles. When the electric current output is at 2.4 W, valve (13) is closed, and valves (14) and (20) are opened. And pump (15) is turned on. When the electric current output is at 24 W, valve (13) is opened, and valves (14) and (20) are closed. And pump (15) is turned off. At the end of each cycle, a new cycle starts again. During the fuel cell operation, the data of the electric current and the voltage are recorded every 30 seconds. The data obtained are shown in FIG. 8 and FIG. 9.

Based on FIGS. 6-9, when hydrogen gas is used as fuel, the cell can operate on a relatively high power. When the fuel cell switches from hydrogen gas to organic fuel, the power output of the cell gradually decreases. 3 minutes later, the power output gradually stabilizes. Then the cell operates on relatively low power. When the fuel source is switched back to hydrogen gas from organic fuel, the power output of the fuel cell gradually increases and the power output of the cell maximizes again.

This kind of phenomenon is due to the catalyst poisoning during the process of catalyzing the oxidization of the organic fuel. Because of the switching between hydrogen gas and organic fuel, the catalyst of the anode is constantly in the cycle of being cleansed, being poisoned, and being cleansed again. Such process not only satisfies the requirement for the power output of the cell, but also increases the power output of the fuel cell, improving the life span of the cell.

Taking the cell made in accordance to Embodiment 4 as an example, for a cell with a 24 W power output, if using only methanol solution as fuel, the fuel cell group should use a series circuit of 40 cells each having an active area of 50 cm$^2$. That is 10 times that of the battery of this invention, and the increased active area will require using more of the costly materials such as the catalyst and the membrane. Actually, for short periods of peak power output, there is very little consumption of the hydrogen gas. Therefore, compared to the currently available fuel cell batteries, while achieving a similar power output, a battery of this invention has not increased in size. In Embodiment 4 and 6, the source of hydrogen gas is merely a cylinder with a diameter of 20 mm and a length of 20 mm. That is significantly smaller than having 36 additional cells with an active area of 50 cm$^2$. Meanwhile, a battery of this invention not only saves on the costs over expensive metal and membranes, but also achieves high power output. When compared with batteries using only hydrogen gas as fuel, a battery of this invention can carry significantly less hydrogen gas, and therefore it minimizes the safety hazards, offering convenience to the users in carrying the battery.

While the present invention has been described with reference to certain preferred embodiments, it is to be understood that the present invention is not limited to such specific embodiments. Rather, it is the contention of the inventor that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A fuel cell battery, comprising:
   a chamber unit having an anode, a cathode, and a proton-exchange membrane located between the anode and the cathode;
   an anode entrance connected to the chamber unit;
   an anode exit connected to the chamber unit;
   a cathode entrance connected to the chamber unit and an oxidant source;
   a cathode exit connected to the chamber unit;
   a hydrogen source through a hydrogen valve and a hydrogen duct connected to the anode entrance;
   an organic fuel source through an organic fuel valve and an organic fuel duct connected to the anode entrance;
   an exit valve connected to the anode exit; and
   a recycler which is connected to the anode exit through an exit duct, the recycler being connected to the organic fuel duct through a return duct, and the recycler having a recycler exit, wherein carbon dioxide exiting the anode exit is discharged through the recycler exit.

2. The fuel cell battery of claim 1 in which the hydrogen source is a hydrogen gas storage device or a storage device of hydrogen gas generating matters.

3. The fuel cell battery of claim 2 in which the hydrogen gas generating matters include hydrogen-depository alloy, hydrogen-depository compound, and solution containing hydrogen-depository compound.

4. The fuel cell battery of claim 3 in which said hydrogen-depository alloy is selected from one or more of following including TiFe alloy, LaNi5 alloy, and Mg2Ni alloy.

5. The fuel cell battery of claim 3 in which said hydrogen-depository compound refers to NaBH4 and/or KBH4.

6. The fuel cell battery of claim 1 in which the organic fuel source is a fuel tank containing organic fuel.

7. The fuel cell battery of claim 1 in which said organic fuel is selected from one or more of the following including alcoholic fluid, aqueous ether and organic acid fluid, or is selected from one or more of the following including alcoholic fluid solution and acid fluid solution.

8. The fuel cell battery of claim 6 in which said organic fuel is selected from one or more of the following including alcoholic fluid, aqueous ether and organic acid fluid, or is selected from one or more of the following including alcoholic fluid solution and acid fluid solution.

9. The fuel cell battery of claim 7 in which said organic fuel is selected from one or more of the following including methanol, ethanol, formic acid, and ethylether, or is selected from one of the following including methanol solution, ethanol solution, and methanoic acid solution.

10. The fuel cell battery of claim 1 in which a pump is installed before or after the organic fuel valve.

11. The fuel cell battery of claim 10 in which the fuel cell battery comprises a recycler which is connected to the anode exit through an exit duct, the recycler being connected to the organic fuel duct through a return duct, and the recycler having a recycler exit.

12. The fuel cell battery of claim 1 in which there are multiple groups of electrodes connected in series, each group having an anode, a cathode and a proton-exchange membrane between said anode and said cathode.

13. The fuel cell battery of claim 8 in which there are multiple groups of electrodes connected in series, each group having an anode, a cathode and a proton-exchange membrane between said anode and said cathode.

14. The fuel cell battery of claim 12 in which the number of the singular electrode groups is between 2 and 100.

15. The fuel cell battery of claim 13 in which the number of the singular electrode groups is between 2 and 100.

16. A fuel cell battery, comprising:
    a chamber unit having an anode, a cathode, and a proton-exchange membrane located between the anode and the cathode;
    an anode entrance connected to the chamber unit;
    an anode exit connected to the chamber unit;
    a cathode entrance connected to the chamber unit and an oxidant source;
    a cathode exit connected to the chamber unit;
    a hydrogen source through a hydrogen valve and a hydrogen duct connected to the anode entrance;
    an organic fuel source through an organic fuel valve and an organic fuel duct connected to the anode entrance, wherein the organic fuel source comprises formic acid;
    an exit valve connected to the anode exit; and
    a recycler connected to the anode exit through an exit duct, wherein the recycler connected to the organic fuel duct through a return duct, and the recycler having a recycler exit, wherein carbon dioxide exiting the anode exit is discharged through the recycler exit;
    wherein during a period requiring high power output, the battery switches to the hydrogen source and turns off the organic fuel source.

17. The fuel cell battery of claim 16 in which there are multiple groups of electrodes connected in series, each group having an anode, a cathode and a proton-exchange membrane between said anode and said cathode.

18. The fuel cell battery of claim 17 in which the number of the singular electrode groups is between 2 and 100.

19. The fuel cell battery of claim 1 wherein water and any unreacted organic fuel exiting the anode exit are circulated to the return duct.

20. The fuel cell battery of claim 16 wherein water and any unreacted organic fuel exiting the anode exit are circulated to the return duct.

* * * * *